(12) United States Patent
Navarro Manchön et al.

(10) Patent No.: US 10,797,767 B2
(45) Date of Patent: Oct. 6, 2020

(54) BEAMFORMING FOR HYBRID ANTENNA ARRAYS

(71) Applicant: Intel IP Corporation, Santa Clara, CA (US)

(72) Inventors: Carles Navarro Manchön, Aalborg (DK); Elisabeth De Carvalho, Nørresundby (DK); Xavier Carreno Bautista De Lisbona, San Jose, CA (US); Tommaso Balercia, San Francisco, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/329,028

(22) PCT Filed: Sep. 30, 2016

(86) PCT No.: PCT/US2016/055024
§ 371 (c)(1),
(2) Date: Feb. 27, 2019

(87) PCT Pub. No.: WO2018/063401
PCT Pub. Date: Apr. 5, 2018

(65) Prior Publication Data
US 2019/0222276 A1 Jul. 18, 2019

(51) Int. Cl.
*H04B 7/0456* (2017.01)
*H04L 25/03* (2006.01)
*H04B 17/345* (2015.01)
*H01Q 3/36* (2006.01)
(Continued)

(52) U.S. Cl.
CPC .......... *H04B 7/0482* (2013.01); *H01Q 3/36* (2013.01); *H04B 1/0475* (2013.01); *H04B 1/38* (2013.01); *H04B 7/0465* (2013.01); *H04B 7/0478* (2013.01); *H04B 17/345* (2015.01); *H04L 25/03343* (2013.01)

(58) Field of Classification Search
CPC .. H04B 7/0482; H04B 7/0478; H04B 7/0465; H04B 1/38; H04B 1/0475; H04B 17/345; H04L 25/03343; H01Q 3/36
See application file for complete search history.

(56) References Cited

U.S. PATENT DOCUMENTS

2010/0054354 A1* 3/2010 Tosato ............... H03M 7/3082
375/260
2013/0057432 A1 3/2013 Rajagopal et al.
(Continued)

OTHER PUBLICATIONS

S. Payami, et al. "Effective RF Codebook Design and Channel Estimation for Millimeter Wave Communication Systems", IEEE CC 2015, Workshop on 5G & Beyond—Enabling Technologies and Applications, 2015, 6 pgs.
(Continued)

*Primary Examiner* — Kenneth T Lam
(74) *Attorney, Agent, or Firm* — Schiff Hardin LLP (57) ABSTRACT

A wireless device, comprising: a hybrid antenna array configured to receive a signal transmitted by another wireless device over a wireless channel; and a transceiver configured to update analog radio frequency precoders of a hierarchical codebook based on magnitudes of multipath components of the wireless channel.

23 Claims, 4 Drawing Sheets (51) Int. Cl.
*H04B 1/04* (2006.01)
*H04B 1/38* (2015.01)

(56) References Cited

U.S. PATENT DOCUMENTS

| | | | |
|---|---|---|---|
| 2013/0201912 A1* | 8/2013 | Sheng | H04B 7/0413 370/328 |
| 2013/0301454 A1* | 11/2013 | Seol | H04B 7/088 370/252 |
| 2013/0315208 A1* | 11/2013 | Striuli | H01Q 1/246 370/331 |
| 2014/0334564 A1 | 11/2014 | Singh et al. | |
| 2014/0355703 A1* | 12/2014 | Schober | H04B 7/0486 375/267 |
| 2015/0289147 A1 | 10/2015 | Lou et al. | |
| 2016/0269093 A1 | 9/2016 | Seol et al. | |
| 2018/0159603 A1* | 6/2018 | Kim | H04L 27/2613 |
| 2018/0183505 A1* | 6/2018 | Kim | H04B 7/0695 |
| 2019/0207656 A1* | 7/2019 | Hlander | H04B 7/0417 |

OTHER PUBLICATIONS

D. Tse, et al., "Fundamentals of Wireless Communications", 646 pgs., Aug. 13, 2004.

R. W. Heath, Jr., et al., "An Overview of Signal Processing Techniques for Millimeter Wave MIMO Systems", 41 pgs., Dec. 9, 2015.

E. de Carvalho, et al., "Ping-Pong Beam Training for Reciprocal Channels With Delay Spread", 5 pgs.

PCT International Search Report issued for PCT/US2016/55024, 2 pgs., dated Jan. 6, 2017.

\* cited by examiner

1: Initialize: 
$$F_A^{[0]} \leftarrow \left[\varphi_{A,0}^{(1)}, \varphi_{A,1}^{(1)}, \cdots, \varphi_{A,N_A^{(1)}-1}^{(1)}\right]$$
$$F_B^{[0]} \leftarrow \left[\varphi_{B,0}^{(1)}, \varphi_{B,1}^{(1)}, \cdots, \varphi_{B,N_B^{(1)}-1}^{(1)}\right]$$
$$a \sim \mathcal{CN}(0_{N_A^{RF}}, I), w_A^{[0]} \leftarrow \frac{a}{\|F_A^{[0]} a\|_2}$$

2: $A$ transmits $x_A^{[0]}$.

3: $B$ receives $y_B^{[0]} = \left(F_B^{[0]}\right)^H H F_A^{[0]} w_A^{[0]} x_A^{[0]} + \left(F_B^{[0]}\right)^H n_B^{[0]}$.

4: $t \leftarrow 1$

5: loop

6: $\quad w_B^{[t]} \leftarrow \left(\frac{y_B^{[t-1]}}{x_A^{[t-1]}}\right)^*$

7: $\quad w_B^{[t]} \leftarrow \frac{w_B^{[t]}}{\|F_B^{[t-1]} w_B^{[t]}\|_2}$

8: $\quad B$ transmits $x_B^{[t]}$.

9: $\quad A$ receives $y_A^{[t]} = \left(F_A^{[t-1]}\right)^H H F_B^{[t-1]} w_B^{[t]} x_B^{[t]} + \left(F_A^{[t-1]}\right)^H n_A^{[t]}$.

10: $\quad F_B^{[t]} \leftarrow \text{Upd. An. Precoder}\left(F_B^{[t-1]}, w_B^{[t]}, C_B\right)$ 11: $\quad w_A^{[t]} \leftarrow \left(\frac{y_A^{[t]}}{x_B^{[t]}}\right)^*$ 12: $\quad w_A^{[t]} \leftarrow \frac{w_A^{[t]}}{\|F_A^{[t-1]} w_A^{[t]}\|_2}$ 13: $\quad A$ transmits $x_A^{[t]}$.

14: $\quad B$ receives $y_B^{[t]} = \left(F_B^{[t]}\right)^H H F_A^{[t-1]} w_A^{[t]} x_A^{[t]} + \left(F_B^{[t]}\right)^H n_B^{[t]}$.

15: $\quad F_A^{[t]} \leftarrow \text{Upd. An. Precoder}\left(F_A^{[t-1]}, w_A^{[t]}, C_A\right)$ 16: $\quad t \leftarrow t + 1$ 17: end loop 18: function Upd. An. Precoder $(F, w, C)$ 19: $\quad$ generate $k_n, i_n, n = 1, \cdots, N^{RF}$ 20: $\quad v_n \leftarrow |w_n|/\sqrt{M^{(k_n)}}, n = 1, \cdots, N^{RF}$ 21: $\quad n_{max} \leftarrow \arg\max_n \{v_n : k_n < L\}$ 22: $\quad n_{min} \leftarrow \arg\min_n \{v_n : n = 1, \cdots, N^{RF}\}$ 23: $\quad$ if $n_{max} \neq n_{min}$ then

24: $\quad\quad$ remove $n_{max}$th, $n_{min}$th columns of $F$

25: $\quad\quad$ add new columns $\varphi_{2i_{n_{max}}}^{(k_{n_{max}}+1)}, \varphi_{2i_{n_{max}}+1}^{(k_{n_{max}}+1)}$ to $F$ 26: $\quad$ end if 27: $\quad$ return $F$ 28: end function

BEAMFORMING FOR HYBRID ANTENNA ARRAYS

TECHNICAL FIELD

The present disclosure generally relates to beamforming for hybrid antenna arrays in which analog radio frequency precoders of a hierarchical codebook are selected and updated based on magnitudes of multipath components of a wireless channel.

BACKGROUND

Beamforming between Multiple-Input Multiple-Output (MIMO) wireless transceivers enables Signal-to-Noise Ratio (SNR) gains for single-stream transmissions that are proportional to a number of antennas of an antenna array. In order to combine coherently a signal received at an antenna array, prior to transmission the signal is linearly precoded. The SNR gain is maximum when a precoder and combiner are calculated based on singular vectors of the MIMO channel matrix associated with the largest singular value. Hence, optimal beamforming requires knowledge of full channel state information (CSI) and computationally demanding singular value decomposition (SVD) of the channel matrix.

Ping-pong digital beamforming methods avoid the need for acquisition of the CSI and the subsequent SVD. These methods involve the MIMO transceivers performing alternate transmissions of known symbols while updating their precoders using simple conjugation and normalization operations. Due to wireless channel reciprocity, these methods implicitly implement a power iteration method that leads to the precoders at both transceivers converging to the left and right singular vectors associated to the largest singular value of the channel matrix, hence approaching an optimal beamforming gain. The cost and power consumption of antenna arrays grows with the number of antennas and the bandwidth and carrier frequency of the system, making digitally controlled antenna arrays infeasible for millimeter wave systems.

Hybrid digital-analog antenna arrays, in which the antenna array is steered using analog phase-shifters and digitally modulated and precoded radio-frequency chains, can reduce cost. However, the analog phase-shifters prevent the use of SVD-based beamforming, as full CSI acquisition becomes infeasible, and also prevents direct applicability of ping-pong beamforming methods. Some methods involve selecting the pre-coders based on a search over a hierarchical codebook, with or without partial CSI acquisition.

BRIEF DESCRIPTION OF THE DRAWINGS

FIGS. 2 and 3 illustrate a beamforming method in accordance with an aspect of the disclosure.

DESCRIPTION OF THE ASPECTS

The present disclosure is directed to beamforming based on alternate transmissions of signals with training symbols transmitted between two wireless devices comprising transceivers via hybrid antenna arrays. After each transmission, the active transceivers update their digital and analog precoders using a two-step procedure. The digital precoder is updated using conjugation and normalization operations in a ping-pong method. The analog precoders are updated by selecting precoders from a hierarchical codebook that steer transmitted signals towards directions of departure of the channel's most significant multipath components.

Figure 1:
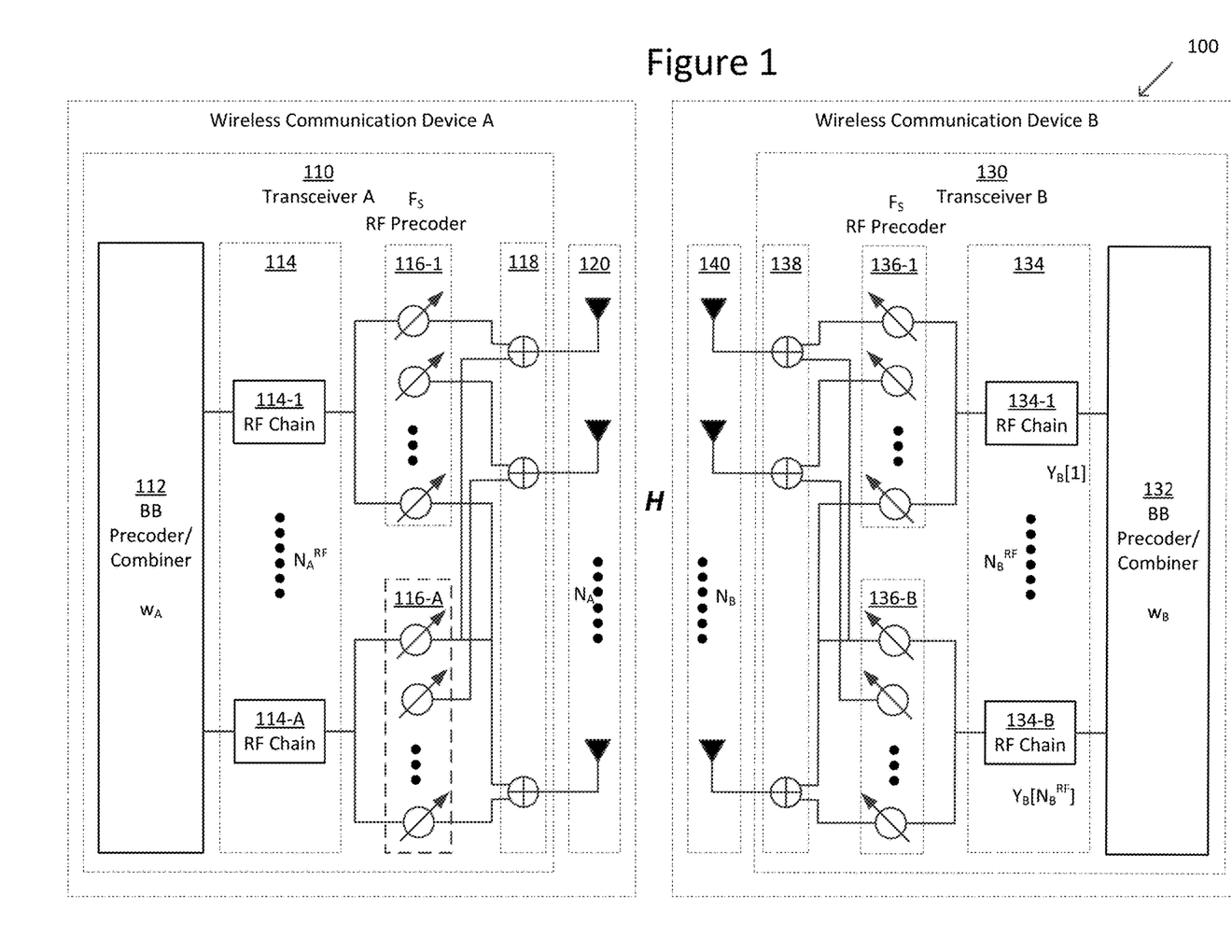
FIG. 1 illustrates a schematic diagram of a wireless communication system in accordance with an aspect of the disclosure.

FIG. 1 illustrates a schematic diagram of a wireless communication system 100 in accordance with an aspect of the disclosure.

The wireless communication system 100 comprises a first transceiver A 110, a first antenna array 120, a second transceiver B 130, and a second antenna array 140. The first transceiver A 110 and the first antenna array 120 are comprised within a first wireless communication device. The second transceiver B 130 and the second antenna array 140 are comprised within a second wireless communication device. The first and second wireless communication devices communicate with each other over a wireless channel H.

The first antenna array 120 is configured to receive a signal transmitted over the wireless channel H. The first antenna array 120 is also configured to transmit a signal from the first wireless device A 110 based on a hybrid structure with a digital baseband precoder 112 and analog radio frequency precoders 116, as explained in detail below.

The first transceiver A 110 comprises a digital baseband precoder/combiner 112 (precoder for signals to be transmitted, and a combiner for received signals), radio frequency chains 114, analog radio frequency precoders 116, and adders 118.

The digital baseband precoder 112 is configured to update the digital precoder by conjugating a received signal, and normalizing a resulting vector to satisfy a power constraint. The next signal transmitted by the first transceiver A 110 is based on the updated digital baseband precoder 112. The digital baseband precoder 112 may be initialized randomly, and then updated through multiple iterations until convergence. Alternatively, if information about the wireless channel H is known, it is not necessary to start with a random digital baseband precoder 112, but instead a digital baseband precoder 112 that is closer to the optimal to thereby reduce a number of iterations and increase the initial performance of the system.

The radio frequency chains 114, as is known, are chains comprised of radio frequency devices like amplifiers, attenuators, measurement instruments, loads, etc. The transceiver 110 is equipped with $N^{RF}_A$ radio frequency chains 114 connected to $N_A$ antennas of the antenna array 120.

Each of the analog radio frequency precoders 116 comprise variable phase-shifters, and couple a respective radio frequency chain 114 to the antenna array 120. From each radio frequency chain 114, a subgroup or all of the antennas of the first hybrid antenna array 120 may be accessed. The variable phase-shifters are adjusted to result in a specific antenna pattern.

The variable phase-shifters are configured to update the analog radio frequency precoders 116 of a hierarchical codebook (not shown) by adjusting their respective phases based on magnitudes of multipath components of the channel. If there are two radio frequency chains 114, for example, for each transmission there are two analog radio frequency precoders 116 chosen from the codebook. Each transmission iteration thus involves two radio frequency beams that are active from the codebook and at respective hierarchical level(s).

The analog radio frequency precoders 116 are described as comprising phase-shifters. Alternatively, the analog radio frequency precoders 116 may also comprise attenuators that, when paired with a suitable hierarchical codebook, could be used in a similar manner.

More specifically, there is a codebook for the first transceiver A 110, and an analogous codebook for the second transceiver B 130. An example codebook $C_A$ is composed of $$L_A = \log_2 \frac{N_A}{N_A^{RF}} + 1$$

levels. For the kth level, a sub-codebook is defined as $C_A^{(k)} = \{\varphi_{A,i}^{(k)}, i=0, 1, \ldots, M_A^{(k)}-1\}$ having M column vectors, $k=1, 2, \ldots, L_A$. Each of the elements of the sub-codebook is defined as $$\varphi_{A,i}^{(k)} = \left[1, e^{-j\psi_{A,i}^{(k)}}, e^{-j2\psi_{A,i}^{(k)}}, \ldots, e^{-j(M_A^{(k)}-1)\psi_{A,i}^{(k)}}, 0_{N_A-M_A^{(k)}}^T\right]^T \quad \text{(Equation 1)}$$

where $\psi_{A,i}^{(k)} = \pi - \pi(2i+1)/M_A^{(k)}$ is the directional cosine of the ith vector at the kth level, and $0_N$ is an N-dimensional column vector with zero entries. Basically $\varphi_{A,i}^{(k)}$ steers the array in the direction $\theta_{A,i}^{(k)} = \cos^{-1}\psi_{A,i}^{(k)}$ with a lobe whose width decreases with the codebook level k (more antennas are used for higher-level codebook p, resulting in more directive patterns).

The hierarchical codebook is described herein as being directional. The hierarchy levels of the codebook relate to different settings of the phase-shifters resulting in different beamwidths. At the lowest level, the beamwidth is relatively wide. There is a limit as to how narrow the beamwidth and corresponding gain can be for a given number of antennas. The codebook is updated until a maximum possible level of the codebook is reached. The disclosure is not limited to directional codebooks; any codebook may be used, provided the codebook is hierarchical.

As explained in detail further below, the analog radio frequency precoders 116 are initialized to a level in the hierarchical codebook that is lowest. The analog radio frequency precoders 116 are then iteratively updated by selecting a first analog radio frequency precoder 116 receiving a multipath component having a maximum magnitude, selecting a second analog radio frequency precoder 116 receiving a multipath component having a minimum magnitude, and replacing each of the first and second analog radio frequency precoders 116 with a radio frequency precoder 116 that is one level higher in the hierarchical codebook than that of the first (maximum) radio frequency precoder 116. The iterations continue until beamforming reaches a maximum possible hierarchical codebook level. The hierarchy depth of the codebook is limited by number of antennas in the antenna array 120, which limits the maximum beamwidth the antenna array 120 can generate. If information about the wireless channel H is known, the analog radio frequency precoders can be initialized to different precoders of the codebook with different hierarchy levels to thereby reduce the number of iterations and increase the initial performance.

The adders 118 are configured to add an output from variable phase-shifters connected to a plurality of radio frequency precoders 116, and output the sum via its respective antenna of the antenna array 120.

The second transceiver B 130 comprises a digital baseband precoder/combiner 132. The baseband combiner 132 is configured to combine received multipath replicas of a signal transmitted by the first transceiver A 110 over the wireless channel H.

The second transceiver B 130 comprises similar elements as the first transceiver A 110. For the sake of brevity, their descriptions will not be repeated.

In the wireless communication system 100, the first transceiver A 110 and the second transceiver B 130 are equipped with antenna arrays 120, 140 with $N_A$ and $N_B$ antennas. An example system has uniform linear antenna arrays 120, 140 with antenna separation $d=\lambda/2$. Each of the antenna arrays 120, 140 has $N_A^{RF}$ and $N_B^{RF}$ respective radio frequency chains 114, 134, and $\lambda$ denotes the wavelength.

Figure 2:
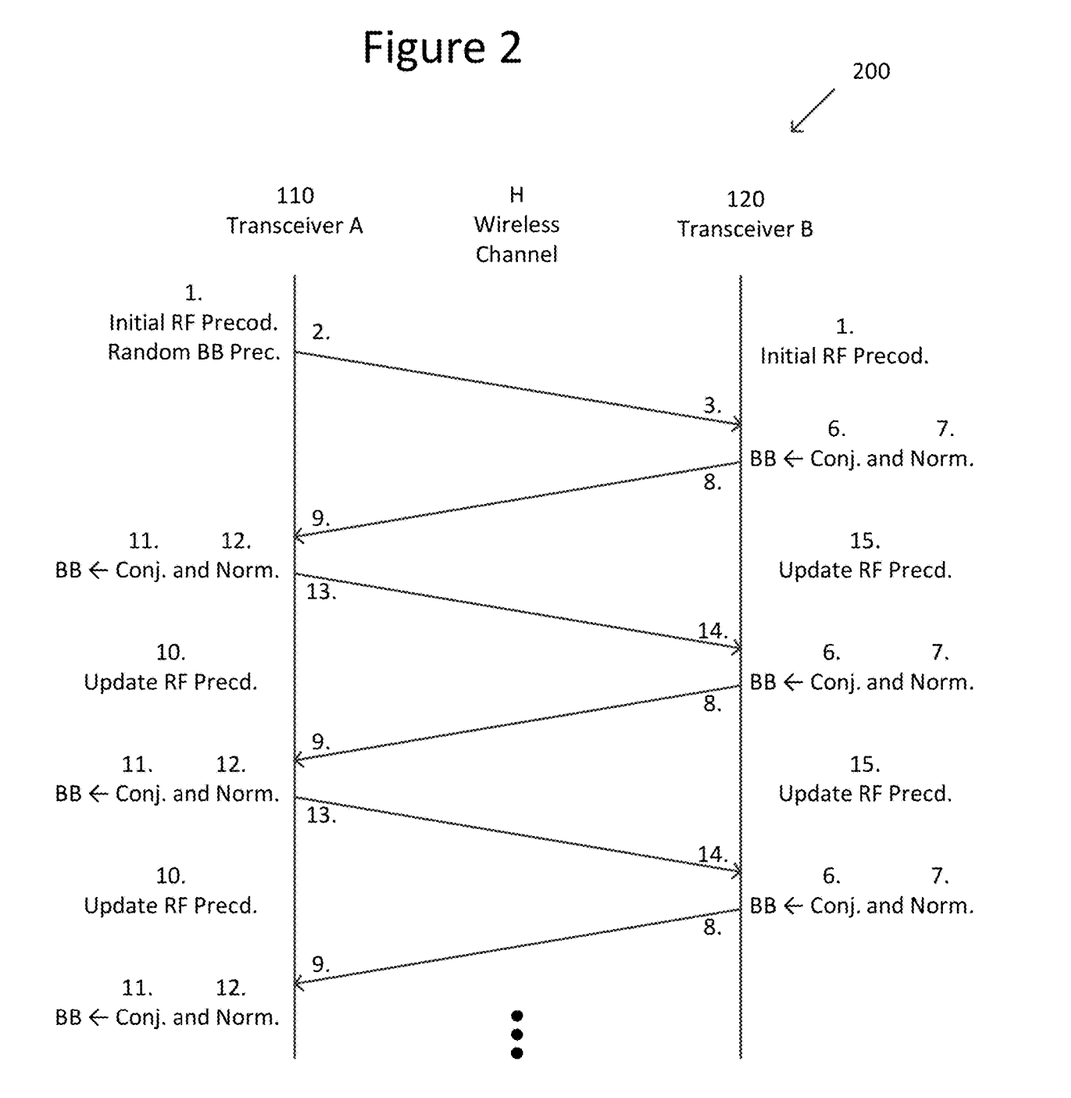

FIGS. 2 and 3 illustrate a beamforming method 200, 300 in accordance with an aspect of the disclosure. The integer labels included in FIG. 2 correspond with the line numbers of the algorithm illustrated in FIG. 3.

At line 1, the analog radio frequency precoders 116, 136 for the first transceiver A 110 and the second transceiver B 130 are initialized to a lowest level (k=1) in their respective hierarchical codebooks. As a result, the radio frequency precoders 116, 136 are initialized to a state in which they scan all directions.

Also in line 1, a random digital baseband precoder 112 is selected for transceiver A 110. Alternatively, if information about the wireless channel matrix H is known, it is not necessary to start with a random digital baseband precoder 112, but instead a digital baseband precoder 112 that is closer to the optimal to thereby reduce a number of iterations.

At line 2, a sequence of alternate pilot symbol transmissions then begins between the first transceiver A 110 and the second transceiver B 130. The first transceiver A 110 transmits a signal $X_A$, and the second transceiver B 130 receives a signal $y_B$ $$y_B = F_B^H H F_A w_A x_A + F_B^H n_B \quad \text{(Equation 3)}.$$

Analogously, and due to channel reciprocity, the signal received at first transceiver A 110 when second transceiver B 130 transmits the pilot symbols $x_B$ is $$y_A = F_A^H H^T F_B w_B x_B + F_A^H n_A \quad \text{(Equation 4)}.$$

In the above equations, $F_A$ and $w_A$ ($F_B$ and $w_B$) denote the radio frequency precoders 116 (136) and baseband precoders 112 (132) at first transceiver A 110 (B 130), with $n_B$ and $n_A$ representing noise vectors. While the baseband precoders 112 (132) can take any values in the complex domain ($w_A \in \mathbb{C}^{N_A^{RF}}$, $w_B \in \mathbb{C}^{N_B^{RF}}$), the entries of $F_A$ and $F_B$ can only take complex values with unit magnitude or zero, as they implement phase shifting operations. In addition, the effective precoders are forced to fulfill the normalization constraint $\|F_A w_A\|^2 = \|F_B w_B\|^2 = 1$.

Lines 5-17 comprise a loop of updating the digital baseband precoders 112, 132 and the analog radio frequency precoders 116, 136. This loop is explained in detail in the following paragraphs.

In lines 6-7, the digital baseband precoders 132 of the second transceiver B 130 are updated by a conjugation operation (line 6) and a normalization operation (line 7). At line 8, the second transceiver B 130 then transmits a signal $X_B$ based on the updated digital baseband precoder 132, and at line 9, the first transceiver A 110 receives signal $y_A$.

Line 10 invokes a function (lines 18-28) to update two analog radio frequency precoders 136 of the second transceiver B 130, as will be explained in more detail further below.

In lines 11-12, the digital baseband precoders 112 of the first transceiver A 110 are updated by a conjugation operation (line 11) and a normalization operation (line 12). At line 13, the first transceiver A 110 then transmits a signal $x_A$ based on the updated digital baseband precoder 112, and at line 14, the second transceiver B 130 receives signal $y_B$.

Line 15 again invokes a function (lines 18-28) to update two analog radio frequency precoders 136, but this time of the first transceiver A 110, as will be explained in more detail below.

To update the analog radio frequency precoders 116 (136) in lines 18-28, first, in line 19, two sequences of values are generated. The values $\hat{k}_n$, n=1, . . . , $N^{RF}$ denote the hierarchical level of the codebook to which the nth column of the current analog radio frequency precoder 116 (136) belongs, while $i_n$, n=1, . . . , $N^{RF}$ indexes the particular codebook element within the $\hat{k}_n$th level.

Based on these values, two columns of the analog radio frequency precoder 116 (136) are selected. In line 21, $n_{max}$ denotes the analog radio frequency precoder 116 (136) over whose direction most signal energy was received, and in line 22, $n_{min}$ denotes the analog radio frequency precoder 116 (136) over which the least energy is received. Both analog radio frequency precoders 116 (136) are removed from the codebook (line 24) and replaced by analog radio frequency precoders 116 (136) of the codebook belonging to one level higher than the analog radio frequency precoder 116 (136) corresponding to $n_{max}$ (line 25), and pointing at two directions around which the analog radio frequency precoder 116 (136) corresponding to $n_{max}$ was pointing. This operation tends to steer the antenna array 120 (140) in the directions over which most signal is received with beams that have increasing directivity as the iterations of the method progress.

The above description is the beamforming of the disclosure in its simplest form, that is, beamforming accomplished before the first transceiver A 110 and second transceiver B 130 begin exchanging data. In this case approximate reciprocity of the wireless channel H is maintained, and the wireless channel H is not varying too quickly.

A further aspect is that rather than pilot symbols being transmitted before data, data transmissions may be included between the pilot symbol transmissions. The pilot symbols are the training symbols to perform beamforming. If there is an initial estimate of the analog or digital beamforming, this information may be used to transmit data instead of pilot/training symbols, and while the data is being transmitted, precoding the data improves the quality of the beamforming. Data may be transmitted once a SNR of the received signal is greater than a predetermined threshold, thereby making it possible to detect the data symbols successfully.

In a case of a wireless channel H varying slowly, the wireless communication system 100 may adapt to the wireless channel variations. The radio frequency precoders 116, 136 may be selected not only based on a maximum magnitude vector (i.e., a strongest path), but alternatively on a lower level in the hierarchical codebook to change to another direction.

For a wireless channel H with faster variations, when a decrease in the magnitudes of the plurality of vectors of the received signal are detected, the analog radio frequency precoders 116, 136 may be updated by replacing the analog radio frequency precoders 116, 136 to a level in the hierarchical codebook that is lower. This aspect of the disclosure provides protection against sudden changes on the wireless channel H produced by blockage, deep fades, etc.

Further, the radio frequency decoders 116, 136 and the digital precoder 112, 132 may be initialized and/or updated periodically using other methods, such as a method based on beamformed CSI pilots, to thereby reduce convergence time and enable tracking of a relatively fast-evolving wireless channel H.

And further, analog radio frequency precoders 116, 136 do not need to be updated for each transmission iteration. For example, one transmission iteration may include an update of the digital baseband precoder 112, 132, and a next iteration may include an update the analog radio frequency precoders 116, 136. Alternatively, there may be one transmission iteration that includes an update of the analog radio frequency precoders 116, 136, and a next iteration that includes an update of both the analog radio frequency precoders 116, 136 and the digital baseband precoder 112, 132.

The analog radio frequency precoder 116, 136 updates enables the use of the beamforming procedure for hybrid digital-analog antenna arrays 120, 140 without specific Channel State Information (CSI) or complex post-processing to estimate the radio frequency precoder 116, 136 updates. The analog radio frequency precoders 116, 136 are described as belonging to a hierarchical, directional codebook. However, the disclosure is not limited to directional codebooks. Any codebook may be used, provided the codebook is hierarchical.

Figure 4:
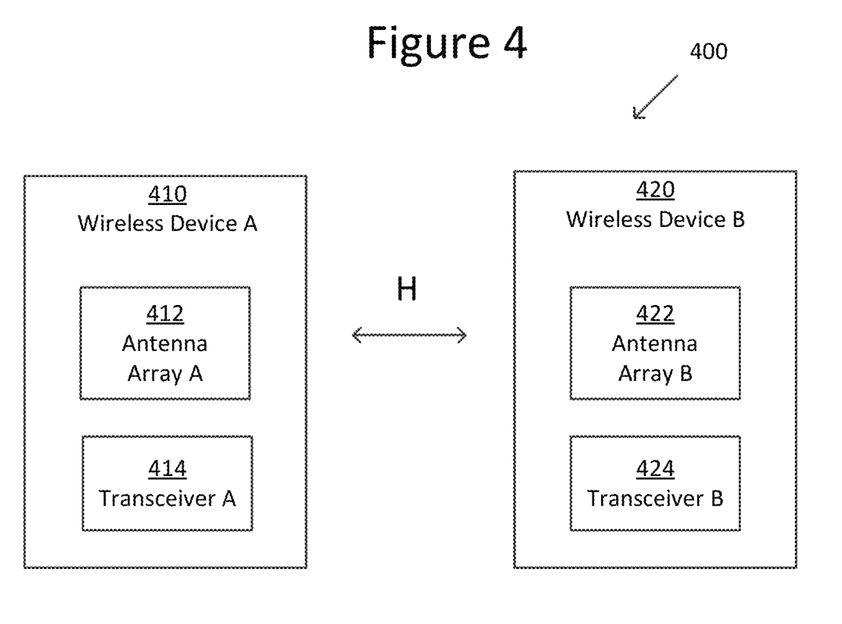
FIG. 4 illustrates a wireless communication system in accordance with an aspect of the disclosure.

FIG. 4 illustrates a wireless communication system 400 in accordance with an aspect of the disclosure.

The wireless communication system comprises a first wireless device A 410 and a second wireless device B 420 communicating over a wireless channel H. The first wireless device comprises an antenna array A 412 and a transceiver A 414. Similarly, the second wireless device B 420 comprises an antenna array B 422 and a transceiver B 424.

Figure 5:
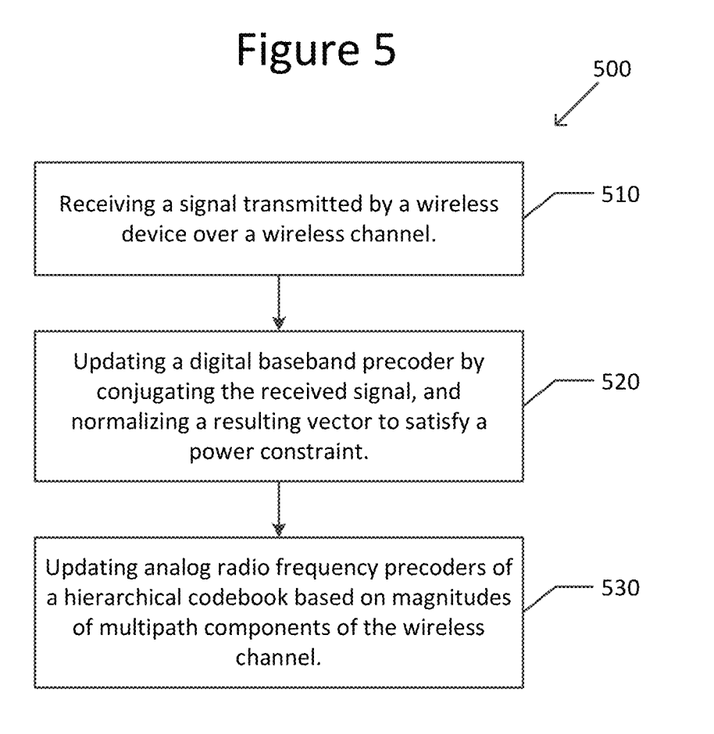
FIG. 5 illustrates a flowchart of a method in accordance with an aspect of the disclosure.

FIG. 5 illustrates a flowchart 500 of a beamforming method in accordance with an aspect of the disclosure.

At Step 510, a signal transmitted by a second wireless device B over a wireless channel H is received by a antenna array 120 of a first wireless device A.

At Step 520, the transceiver 110 updates the digital baseband precoder 112 by conjugating the received signal, and normalizing a resulting vector to satisfy a power constraint.

At Step 530, the transceiver 110 of the first wireless device A updates analog radio frequency precoders 116 of a hierarchical codebook based on magnitudes of multipath components of the wireless channel.

This disclosure is also applicable to Frequency-Division Duplexing. In an FDD application, there is a full-duplex communications link that uses two different radio frequencies for transmitter and receiver operations, and the transmit direction and receive direction frequencies are separated by a defined frequency offset.

The beamforming disclosed herein is advantageous in that it avoids a need for CSI acquisition, and converges with only a few alternate transmissions. Performance-wise, this beamforming achieves a higher beamforming gain than previous schemes devised for digital arrays at low SNR ranges, while performing closely to the optimal SVD-based beamformers at the high SNR regime.

Further, the computational complexity is negligible compared to other transceiver operations and compared with alternative beamforming methods. The digital beamformers/combiners are computed by conjugating a digital signal received in a previous transmission and normalizing the resulting vector to satisfy a power constraint. The analog precoders/combiners are chosen from a predefined hierarchical codebook, which can be designed offline, if desired. The search in the hierarchical codebook is performed by simply sorting in descending order magnitude entries of a normalized version of the received signal vector.

The following examples pertain to further aspects.

Example 1 is a wireless device, comprising: a hybrid antenna array configured to receive a signal transmitted by another wireless device over a wireless channel; and a transceiver configured to update analog radio frequency precoders of a hierarchical codebook based on magnitudes of multipath components of the wireless channel.

In Example 2, the subject matter of Example 1, wherein the transceiver is further configured to update the analog radio frequency precoders by: selecting a first radio frequency precoder receiving a multipath component having a maximum magnitude; selecting a second radio frequency precoder receiving a multipath component having a minimum magnitude; and replacing each of the first and second radio frequency precoders with a radio frequency precoder that is one level higher in the hierarchical codebook than that of the first radio frequency precoder.

In Example 3, the subject matter of Example 2, wherein the transceiver comprises: radio frequency chains; and variable phase-shifters or attenuators coupling the radio frequency chains with the respective antennas of the hybrid antenna array, and configured to update the analog radio frequency precoders.

In Example 4, the subject matter of Example 1, wherein the transceiver is further configured to update a digital baseband precoder by conjugating the received signal, and normalizing a resulting vector to satisfy a power constraint.

In Example 5, the subject matter of Example 4, wherein the transceiver is further configured to transmit a transmit signal based on the updated digital baseband precoder.

In Example 6, the subject matter of Example 5, wherein if a signal-to-noise ratio of the received signal is greater than a predetermined threshold, the transmit signal is transmitted comprising data or pilots.

In Example 7, the subject matter of Example 1, wherein the received signal comprises pilot symbols.

In Example 8, the subject matter of Example 1, wherein the transceiver is further configured to update the analog radio frequency precoders periodically to adjust to a varying wireless channel condition.

In Example 9, the subject matter of Example 1, wherein the transceiver is further configured to: detect a decrease in the magnitudes of the plurality of the multipath components of the wireless channel; and update the analog radio frequency precoders by replacing the analog radio frequency precoders to a level in the hierarchical codebook level that is lower.

Example 10 is a method of beamforming, comprising: receiving, by a hybrid antenna array of a first wireless device, a signal transmitted by a second wireless device over a wireless channel; and updating, by a transceiver of the first wireless device, analog radio frequency precoders of a hierarchical codebook based on magnitudes of multipath components of the wireless channel.

In Example 11, the subject matter of Example 10, wherein the updating of the analog radio frequency precoders comprises: selecting a first radio frequency precoder receiving a multipath component having a maximum magnitude; selecting a second radio frequency precoder receiving a multipath component having a minimum magnitude; and replacing each of the first and second radio frequency precoders with a radio frequency precoder that is one level higher in the hierarchical codebook than that of the first radio frequency precoder.

In Example 12, the subject matter of Example 10, wherein the updating of the analog radio frequency precoders comprises: adjusting values of variable phase-shifters or attenuators, which couple radio frequency chains with respective antennas of the hybrid antenna array.

In Example 13, the subject matter of Example 10, further comprising: initializing the analog radio frequency precoders to a level in the hierarchical codebook that is lowest.

In Example 14, the subject matter of Example 10, wherein the hierarchical codebook is a directional hierarchical codebook.

In Example 15, the subject matter of Example 10, further comprising: updating, by the transceiver, a digital baseband precoder by conjugating the received signal, and normalizing a resulting vector to satisfy a power constraint.

In Example 16, the subject matter of Example 15, further comprising: initializing the digital baseband precoder randomly.

In Example 17, the subject matter of Example 15, further comprising: initializing the analog radio frequency precoders or the digital baseband precoder based on Channel State Information (CSI); and transmitting a transmit signal comprising pilot symbols and data based on the initialized analog radio frequency precoders or the initialized digital baseband precoder.

In Example 18, the subject matter of Example 15, wherein the analog radio frequency decoders or the digital precoder is initialized or updated periodically by an additional beamforming method.

In Example 19, the subject matter of Example 15, further comprising: transmitting, by the first wireless device, a transmit signal based on the updated digital baseband precoder.

In Example 20, the subject matter of Example 19, further comprising: repeating, by the second wireless device, the receiving step, the updating analog radio frequency precoders step, the updating the digital baseband precoder step, and the transmitting step.

In Example 21, the subject matter of Example 20, wherein the updating analog radio frequency precoders step or the updating the digital baseband precoder step is not performed for each repeated iteration.

In Example 22, the subject matter of Example 19, wherein if a signal-to-noise ratio of the received signal is greater than a predetermined threshold, the transmit signal is transmitted comprising data.

In Example 23, the subject matter of Example 10, wherein the received signal comprises pilot symbols.

In Example 24, the subject matter of Example 10, wherein the analog radio frequency precoders are updated periodically to adjust to a varying wireless channel condition.

In Example 25, the subject matter of Example 24, further comprising: detecting a decrease in the magnitudes of the plurality of the multipath components of the wireless channel; and updating the analog radio frequency precoders by replacing the analog radio frequency precoders to a level in the hierarchical codebook that is lowest.

Example 26 is a wireless device, comprising: a hybrid antenna array for receiving a signal transmitted by another wireless device over a wireless channel; and a transceiving means for updating analog radio frequency precoders of a hierarchical codebook based on magnitudes of multipath components of the wireless channel.

In Example 27, the subject matter of Example 26, wherein the transceiving means is further for updating the analog radio frequency precoders by: selecting a first radio frequency precoder receiving a multipath component having a maximum magnitude; selecting a second radio frequency precoder receiving a multipath component having a minimum magnitude; and replacing each of the first and second radio frequency precoders with a radio frequency precoder that is one level higher in the hierarchical codebook than that of the first radio frequency precoder.

In Example 28, the subject matter of Example 27, wherein the transceiving means comprises: radio frequency chains; and variable phase-shifting means or attenuating means for coupling the radio frequency chains with the respective antennas of the hybrid antenna array, and for updating the analog radio frequency precoders.

In Example 29, the subject matter of Example 26, wherein the transceiving means is further for updating a digital baseband precoder by conjugating the received signal, and normalizing a resulting vector to satisfy a power constraint.

In Example 30, the subject matter of Example 29, wherein the transceiving means is further for transmitting a transmit signal based on the updated digital baseband precoder.

In Example 31, the subject matter of Example 30, wherein if a signal-to-noise ratio of the received signal is greater than a predetermined threshold, the transmit signal is transmitted comprising data or pilots.

In Example 32, the subject matter of any of Examples 26-31, wherein the received signal comprises pilot symbols.

In Example 33, the subject matter of any of Examples 26-31, wherein the transceiving means is further for updating the analog radio frequency precoders periodically to adjust to a varying wireless channel condition.

In Example 34, the subject matter of any of Examples 26-31, wherein the transceiving means is further for: detecting a decrease in the magnitudes of the plurality of the multipath components of the wireless channel; and updating the analog radio frequency precoders by replacing the analog radio frequency precoders to a level in the hierarchical codebook level that is lower.

Example 35 is an apparatus substantially as shown and described.

Example 36 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A wireless device, comprising:
a hybrid antenna array configured to receive a signal transmitted by another wireless device over a wireless channel; and
a transceiver configured to update analog radio frequency precoders of a hierarchical codebook based on magnitudes of multipath components of the wireless channel, and by:
selecting a first radio frequency precoder receiving a multipath component having a maximum magnitude;
selecting a second radio frequency precoder receiving a multipath component having a minimum magnitude; and
replacing each of the first and second radio frequency precoders with a radio frequency precoder that is one level higher in die hierarchical codebook than that of the first radio frequency precoder.

2. The wireless device of claim 1, wherein the transceiver comprises:
radio frequency chains; and
variable phase-shifters or attenuators coupling the radio frequency chains with the respective antennas of the hybrid antenna array, and configured to update the analog radio frequency precoders.

3. The wireless device of claim 1, wherein the received signal comprises pilot symbols.

4. The wireless device of claim 1, wherein the transceiver is further configured to update the analog radio frequency precoders periodically to adjust to a varying wireless channel condition.

5. A wireless device, comprising:
a hybrid antenna array configured to receive a signal transmitted by another wireless device over a wireless channel; and
a transceiver configured to update analog radio frequency precoders of a hierarchical codebook based on magnitudes of multipath components of the wireless channel and to update a digital baseband precoder by conjugating the received signal, and normalizing a resulting vector to satisfy a power constraint.

6. The wireless device of claim 5, wherein the transceiver is further configured to transmit a transmit signal based on the updated digital baseband precoder.

7. The wireless device of claim 6, wherein if a signal-to-noise ratio of the received signal is greater than a predetermined threshold, the transmit signal is transmitted comprising data or pilots.

8. A wireless device, comprising:
a hybrid antenna array configured to receive a signal transmitted by another wireless device over a wireless channel; and
a transceiver configured to update analog radio frequency precoders of hierarchical codebook based on magnitude of multipath components of the wireless channel, to
detect a decrease in the magnitudes of the plurality of the multipath components of the wireless channel, and
to update the analog radio frequency precoders by replacing the analog radio frequency precoders to a level in the hierarchical codebook level that is lower.

9. A method of beamforming, comprising:
receiving, by a hybrid antenna array of a first wireless device, a signal transmitted by a second wireless device over a wireless channel; and
updating, by a transceiver of the first wireless device, analog radio frequency precoders of a hierarchical codebook based on magnitudes of multipath components of the wireless channel, wherein the updating of the analog radio frequency precoders comprises:

selecting a first radio frequency precoder receiving a multipath component having a maximum magnitude; and selecting a second radio frequency precoder receiving a multipath component having a minimum magnitude; and replacing each of the first and second radio frequency precoders with a radio frequency precoder that is one level higher in the hierarchical codebook than that of the first radio frequency precoder.

10. The method of claim 9, wherein the updating of the analog radio frequency precoders comprises:

adjusting values of variable phase-shifters or attenuators, which couple radio frequency chains with respective antennas of the hybrid antenna array.

11. The method of claim 9, further comprising:
initializing the analog radio frequency precoders to a level in the hierarchical codebook that is lowest.

12. The method of claim 9, wherein the hierarchical codebook is a directional hierarchical codebook.

13. The method of claim 9, wherein the received signal comprises pilot symbols.

14. The method of claim 9, wherein the analog radio frequency precoders are updated periodically to adjust to a varying wireless channel condition.

15. The method of claim 14, further comprising:
detecting a decrease in the magnitudes of the plurality of the multipath components of the wireless channel; and
updating the analog radio frequency precoders by replacing the analog radio frequency precoders to a level in the hierarchical codebook that is lowest.

16. A method of beamforming, comprising:
receiving, by a hybrid antenna array of a first wireless device, a signal transmitted by a second wireless device over a wireless channel;

updating, by a transceiver of the first wireless device, analog radio frequency precoders of a hierarchical codebook based on magnitudes of multipath components of the wireless channel; and updating, by the transceiver, a digital baseband precoder by conjugating the received signal, and normalizing a resulting vector to satisfy a power constraint.

17. The method of claim 16, further comprising:
initializing the digital baseband precoder randomly.

18. The method of claim 16, further comprising:
initializing the analog radio frequency precoders or the digital baseband precoder based on Channel State Information (CSI); and
transmitting a transmit signal comprising pilot symbols and data based on the initialized analog radio frequency precoders or the initialized digital baseband precoder.

19. The method of claim 16, wherein the analog radio frequency decoders or the digital precoder is initialized or updated periodically by an additional beamforming method.

20. The method of claim 16, further comprising:
transmitting, by the first wireless device, a transmit signal based on the updated digital baseband precoder.

21. The method of claim 20, further comprising:
repeating, by the second wireless device, the receiving step, the updating analog radio frequency precoders step, the updating the digital baseband precoder step, and the transmitting step.

22. The method of claim 21, wherein the updating analog radio frequency precoders step or the updating the digital baseband precoder step is not performed for each repeated iteration.

23. The method of claim 20, wherein if a signal-to-noise ratio of the received signal is greater than a predetermined threshold, the transmit signal is transmitted comprising data.

* * * * *